United States Patent [19]

Ichikawa

[11] Patent Number: 5,912,794
[45] Date of Patent: Jun. 15, 1999

[54] ABNORMALITY DETECTION AND PROTECTION CIRCUIT FOR SEMICONDUCTOR DEVICE

[75] Inventor: Hiroaki Ichikawa, Nagano, Japan

[73] Assignee: Fuji Electric Co., Ltd., Japan

[21] Appl. No.: 08/808,067

[22] Filed: Feb. 28, 1997

[30] Foreign Application Priority Data

Mar. 1, 1996 [JP] Japan .................................. 8-044416

[51] Int. Cl.⁶ .................................................. H02H 3/24
[52] U.S. Cl. .............................. 361/92; 361/94; 361/100
[58] Field of Search ................................ 361/78, 94–96, 361/100, 101, 23, 24, 30, 92; 363/50, 53, 54, 56–58

[56] References Cited

U.S. PATENT DOCUMENTS 5,216,352  6/1993  Studtmann et al. ...................... 361/96

*Primary Examiner*—Sally C. Medley
*Attorney, Agent, or Firm*—Rossi & Associates

[57] ABSTRACT

An abnormality detection and protection circuit is provided in association with a driving circuit for a semiconductor device, for detecting plural types of abnormalities and protecting the device from the abnormalities. The present circuit includes a plurality of abnormality detecting devices for detecting the plural types of abnormalities, respectively, a plurality of abnormality storage circuits each provided for the corresponding abnormality detecting devices for storing occurrence of the corresponding type of abnormality, and an abnormality transmitting circuit that transmits a signal representing the detected type of the abnormality to an overall control system for controlling a plurality of semiconductor devices. The circuit of the invention further includes an operation stopping device for stopping a switching operation of the semiconductor device, which device is immediately operated if the detected abnormality is of a type that requires emergency protection, so as to automatically stop the switching operation of the semiconductor device.

6 Claims, 2 Drawing Sheets

ABNORMALITY DETECTION AND PROTECTION CIRCUIT FOR SEMICONDUCTOR DEVICE

FIELD OF THE INVENTION

The present invention relates to an abnormality detection and protection circuit for detecting abnormalities that occur during an operation of a semiconductor device which is used in each arm of a power bridge circuit device, for examples, and operates in response to switching commands from an overall control system, and for protecting the semiconductor device from the abnormalities.

BACKGROUND OF THE INVENTION

In the power bridge circuit device or the like, a driving circuit is provided with respect to each of a plurality of semiconductor devices that receive switching commands from an overall control system, for driving a gate or base of the semiconductor device in response to the switching commands. Further, an abnormality detection circuit and protection circuit for protecting the semiconductor device from various types of abnormalities and troubles that may occur during the operation of the device is conveniently incorporated, along with the above driving circuit, into an integrated circuit for the semiconductor device, to thus provide one chip. The abnormality detection circuit is adapted to detect overcurrent flowing through the semiconductor device, or an excessive increase in the temperature of the device or chip. When an abnormality is detected by this circuit, the protection circuit usually stops or turns off the switching operation of the semiconductor device, to automatically shut off current flowing through the device immediately after the detection of the abnormality or a certain time after the detection.

In addition to these abnormality detection circuit and protection circuit, another circuit is conventionally incorporated which serves to notify the overall control system that an abnormality has been detected, and that a command to stop the operation of the semiconductor device has been generated based on the detection. In response to this notification, the overall control system is able to stop or interrupt, as needed, the switching commands that have been given to the semiconductor device. This ensures that the semiconductor device never performs its switching operation and can be thus surely protected, even in the worst situations in which the semiconductor device does not receive a command to stop its operation despite the fact that an abnormality has been detected, or a circuit for stopping the operation of the device does not normally operate even if it receives such a command.

Although the conventional abnormality detection and protection circuit is able to stop the switching operation of the semiconductor device for its protection with considerably high reliability upon occurrence of abnormalities, it has been required in recent years to provide more rational protection in view of the operation of the whole circuit device into which a plurality of semiconductor devices are incorporated, rather than merely providing protection for each of the semiconductor devices. In the case where a power inverter device for driving a motor consists of a bridge circuit in which semiconductor devices are incorporated in respective arms thereof, for example, the inverter device will not normally perform its function if the operation of the individual semiconductor device in each of the arms is suddenly stopped in no conjunction with the other arms, except when the abnormality is of a type that requires emergency stop. Depending upon the type of a machine coupled to the motor, it is not permitted to suddenly stop the operations of the semiconductor devices in all of the arms of the inverter at the same time and eliminate the driving force for the motor.

SUMMARY OF THE INVENTION

It is therefore an object of the present invention to provide an abnormality detection and protection circuit for a semiconductor device, which is able to easily meet or deal with requirements from a circuit device into which a plurality of semiconductor devices are incorporated.

The above object may be accomplished according to the principle of the present invention, which provides an abnormality detection and protection circuit including a plurality of abnormality detecting means for respectively detecting plural types of abnormalities relating to a semiconductor device, a plurality of abnormality storage circuits provided for the respective abnormality detecting means, for storing the occurrence of the respective types of abnormalities, an abnormality transmitting circuit that transmits a signal representing the type of the detected abnormality stored in the abnormality storage circuit to an overall control system, and an operation stopping means for stopping the switching operation of the semiconductor device, wherein when the abnormality detected by the abnormality detecting means is of a type that requires emergency protection, the operation stopping means operates to automatically stop the switching operation of the semiconductor device.

When an abnormality is detected by one of the above-indicated abnormality detecting means, the abnormality transmitting circuit transmits a signal representing the detected type of the abnormality to the overall control system to cause the control system to select whether to eliminate switching commands for the semiconductor device depending upon the type of the abnormality and the situation of the circuit device, or generate switching commands suitable for the type of the abnormality. At the same time, the abnormality storage circuit stores the detected type of abnormality, and causes the abnormality transmitting circuit to transmit the occurrence of the abnormality based on the storage in the storage circuit and also maintain the transmitting state so that the overall control system receiving the signal is given enough time to select its operating mode.

Where the abnormality detected is of a type that requires emergency protection, for example, where it is short-circuit of a load of the semiconductor device, the operation stopping means is caused to immediately stop the operation of the semiconductor device without waiting for the operation of the overall control system. If the abnormality detected is of any other type, the overall control system may decide the manner or mode of dealing with the abnormality. Since the overall control system may experience a delay or a total failure in dealing with the abnormality, it is preferable to set in advance the maximum time limit that is permissible in terms of protection of the semiconductor device, and automatically stop the operation of the semiconductor device upon a lapse of this time limit. It is further desirable to set this time limit for each of the different types of abnormalities.

Each of the abnormality storage circuits is preferably constructed such that its flip-flop is combined with reset means for resetting the flip-flop. While the stored abnormality information is eliminated provided that the abnormality disappears, the reset means is desirably operated to eliminate the storage under other conditions or requirements, such as that the abnormality storage circuit has received a reset command from the overall control system, or that switching commands are being generated by the overall control system. If the latter provides a condition under which the storage is eliminated, the abnormality storage circuit is preferably constructed so that the reset means is not operated until after a lapse of a predetermined time even if the abnormality disappears.

The abnormality transmitting circuit is preferably constructed to individually transmit the respective types of abnormalities to the overall control system, or to code each type of abnormality and then transmit the coded signal to the control system. Where the semiconductor device is incorporated in an arm, particularly an upper arm receiving high voltage, of a power bridge circuit, it is preferable to transmit each type of abnormality through insulating means such as a photo coupler in the former case, or to give each type of abnormality to an encoder through a level shift circuit in the latter case.

BRIEF DESCRIPTION OF THE DRAWINGS

The invention will be described in greater detail with reference to certain preferred embodiments thereof and the accompanying drawings, wherein.

DETAILED DESCRIPTION OF THE PREFERRED EMBODIMENTS

Figure 1:
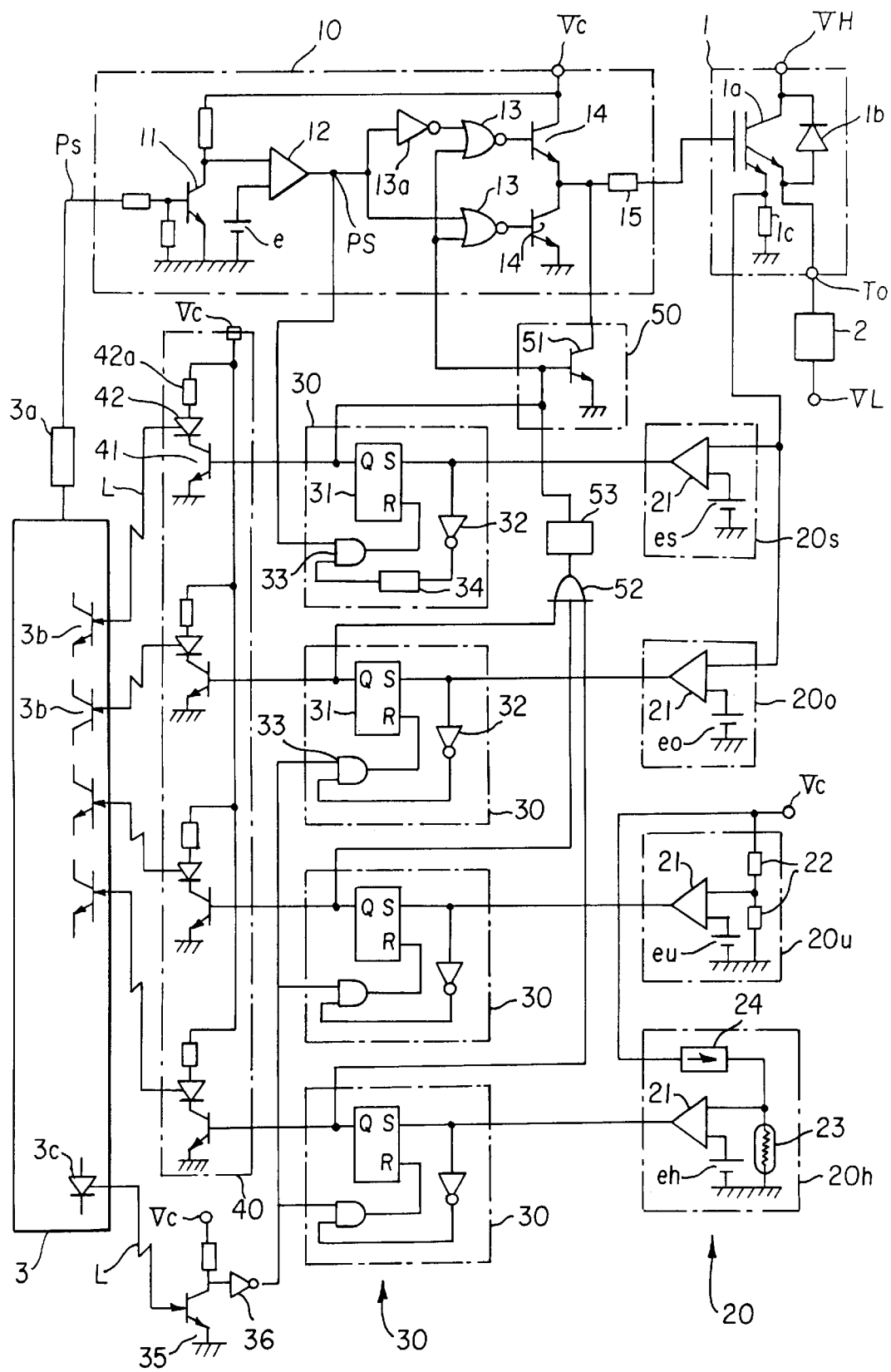
FIG. 1 is a circuit diagram showing the first embodiment of the abnormality detection and protection circuit of the present invention, along with a semiconductor device, driving circuit for the device, and an overall control system.
Figure 2:
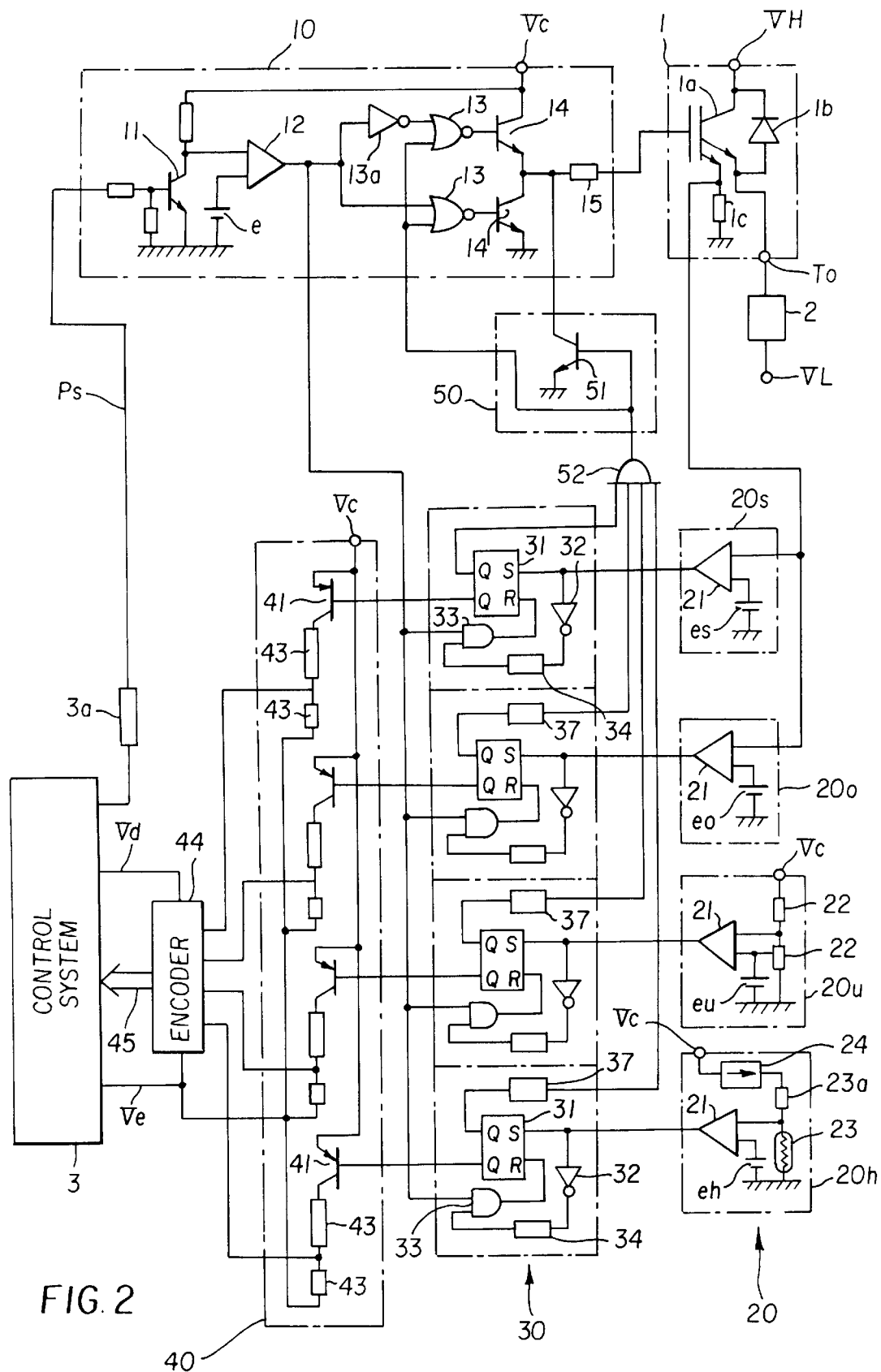
FIG. 2 is a circuit diagram showing the second embodiment of the present invention, along with a semiconductor device, driving circuit for the device, and an overall control system.

Presently preferred embodiments of the present invention will be described in detail, referring to the accompanying drawings. FIG. 1 and FIG. 2 are circuit diagrams showing the first and second embodiments of abnormality detection and protection circuit of the present invention, respectively, each along with a semiconductor device, driving circuit for driving the semiconductor device, and an overall control system. While the present invention is applied to insulated-gate bipolar transistors (hereinafter referred to as IGBT) in the embodiments that will be described below, this invention is also applicable to power bipolar transistors, MOS transistors and others. While the circuits of the first and second embodiments consist of bipolar circuits, the circuit according to the present invention may consist of MOS circuits, CMOS circuits, BiCMOS circuits or the like.

Referring first to FIG. 1, a semiconductor device 1 shown in the upper, right part of the figure is incorporated in each arm of a three-phase power bridge circuit, for example, so as to drive a load 2. This semiconductor device 1 has an IGBT 1a as its main body, diode 1b for free-wheeling of the bridge circuit, and a resistor 1c for detecting current. The IGBT Ia has a collector and an emitter between which the diode 1b is connected, and an auxiliary emitter to which the resistor 1c is connected. The semiconductor device 1 shown in FIG. 1, which is used for the upper arm of the bridge circuit, receives a high-voltage-side power supply voltage VH at the collector side thereof, and receives a low-voltage-side power supply voltage VL as output voltage of the bridge circuit, through an output terminal To on the emitter side and the load 2.

Driving circuit 10 shown in the upper part of FIG. 1 is adapted to drive a gate of the semiconductor device 1 depending upon the logic state of a switching command Ps. In the embodiment of FIG. 1, the switching command Ps is amplified by a transistor 11, and then compared with a reference voltage e by a comparator 12 so that the command Ps is shaped into a switching command PS having an accurate waveform. The thus obtained switching command PS and an auxiliary signal generated by an inverter 13a are respectively given to a pair of NOR gates 13 that are normally placed in the "enable" state, so as to alternately turn on and off a pair of corresponding transistors 14 that constitute an output-stage inverter, and the semiconductor device 1 is driven by the output of this inverter received through a resistor 15. Although this driving circuit 10 needs to be operated on a potential suitable for driving the semiconductor device 1 for the upper arm of the bridge circuit as described above, FIG. 1 shows, for the sake of convenience, that the driving circuit 10 is supplied with a control power supply voltage Vc so as to operate on a ground potential.

The overall control system 3 shown in the lower, left part of FIG. 1 is a control device usually including a microprocessor, which is provided for controlling the whole power bridge circuit in which a plurality of semiconductor devices 1 are used. Since the overall control system 3 operates on a reference potential that is different from the ground potential described above, the switching commands Ps generated by this control system 3 are given to the driving circuit 10 through a suitable level shift circuit 3a provided in conjunction with the control system 3.

In the first embodiment of FIG. 1, the abnormality detection and protection circuit provided with respect to the semiconductor device 1 according to the present invention consists of four abnormality detecting means 20, four abnormality storage circuits 30 corresponding to the respective detecting means 20, abnormality transmitting circuit 40, and operation stopping means 50, which are respectively surrounded by one-dot chain lines, and accessary circuits thereof Similarly to the driving circuit 10, these circuits and means 20, 30, 40 and 50 operate on the ground potential as shown in FIG. 1, with the control power supply voltage Vc supplied to these circuits and means. It is normally convenient to integrate all of these constituent elements of the circuit of the present invention within a chip of an integrated circuit device for the driving circuit 10 provided with respect to each semiconductor device 1.

The abnormality detecting means 20 serve to detect different types of abnormalities relating to the semiconductor device 1. In the first embodiment of FIG. 1, short-circuit detecting means 20s, overcurrent detecting means 20o, undervoltage detecting means 20u and overheat detecting means 20h are provided each of which uses a comparator 21 to take its output of comparison as an abnormality signal. The short-circuit detecting means 20s serves to detect the short-circuit state of the load 2 by comparing the voltage detected by the resistor 1c with respect to the current flowing through the semiconductor device 1, with a reference voltage es. The overcurrent detecting means 20o serves to detect the overcurrent state of semiconductor device 1, by comparing the same voltage detected based on the same current with a reference voltage eo that is set to be lower than the above reference voltage es. The undervoltage detecting means 20u compares the voltage obtained by dividing the control power supply voltage Vc by means of a pair of resistors 22, with a reference voltage eu, so as to determine whether the level of the voltage Vc is reduced to be lower than its permissible lower limit. The overheat detecting means 20h causes constant current to flow from a current source 24 to a thermistor 23 attached to the chip of the semiconductor device 1, so as to detect an excessive increase in the temperature of the semiconductor device 1 by comparing a voltage drop of the constant current with a reference voltage eh.

The abnormality storage circuits 30 corresponding to the respective abnormality detecting means 20 as described above are provided for storing occurrence of the respective types of abnormalities. In the embodiment of FIG. 1, each of the abnormality storage circuits 30 stores occurrence of the corresponding type of abnormality by setting a flip-flop 31 in response to a high level of abnormality signal generated by the corresponding abnormality detecting means 20. When the abnormality disappears and the level of the abnormality signal is lowered, the inverter 32 generates a high-level signal to enable an AND gate 33, and, when the AND gate 33 receives a reset command, the flip-flop 31 is reset to eliminate the stored abnormality in the storage circuit 30. While four abnormality storage circuits 30 are provided that correspond to the respective abnormality detecting means 20s, 20o, 20u, 20h in the embodiment of FIG. 1, only the uppermost abnormality storage circuit 30 corresponding to the short-circuit detecting means 20s is constructed such that the AND gate 33 receives the output of the inverter 32 through a delay means 34, and is enabled in response to a high-level output of the inverter 32 received through the delay means 34. The abnormality transmitting circuit 40 serves to transmit signals representing different types of abnormalities to the overall control system 3 based on the contents (presence of abnormalities) stored in the abnormality storage circuits 30. In the embodiment of FIG. 1, the abnormality transmitting circuit 40 consists of four independent circuits that operate upon receipt of Q outputs of the flip-flops 31 of the respective abnormality storage circuits 30. Each independent circuit includes a transistor 41 that receives the Q output of the corresponding flip-flop 31, light emitting diode 42 of a photo coupler, and a resistor 42a which are connected in series with respect to the control power supply voltage Vd, and is adapted to transmit a signal in the form of light L that represents occurrence of each type of abnormality to the overall control system 3 when the transistor 41 is ON. The overall control system 3 is provided with four photo transistors 3b in the form of photo couplers to deal with the respective signals from these independent circuits. The signal indicating occurrence of an abnormality is transmitted through the light L since the abnormality transmitting circuit 40 and overall control system 3 operate on largely different reference potentials as described above.

The operation stopping means 50 serves to stop the switching operation of the semiconductor device 1 when necessary, and may perform this function only by disabling the NOR gates 13 for controlling the transistors 14 of the output-stage inverter of the driving circuit 10 as described above. In the embodiment of FIG. 1, however, the operation stopping means 50 is provided with a transistor 51 that is turned ON to ground the output of the driving circuit 10 to the semiconductor device 1, so as to completely negate or cancel the output.

In the abnormality detection and protection circuit constructed as described above according to the present invention, when the abnormality detecting means 20 detects an abnormality, the abnormality storage circuit 30 corresponding to the detected type of the abnormality is caused to store occurrence of the abnormality, and the independent circuit of the abnormality transmitting circuit 40 that corresponds to this type of abnormality is caused to transmit a signal representing the occurrence of the abnormality to the overall control system 3. When the abnormality is of a type that requires emergency protection of the semiconductor device 1, the operation stopping means 50 is caused to immediately stop the switching operation of the semiconductor device 1 without waiting for the operation of the overall control system 3. In the first embodiment of FIG. 1, the type of abnormality that requires emergency protection is short-circuit of the load 2 of the semiconductor device 1, and the uppermost abnormality storage circuit 30 in FIG. 1 that corresponds to the short-circuit detecting means 20s generates the Q output of the flip-flop 31 to the operation stopping means 50 so as to immediately stop the switching operation of the semiconductor device 1 upon occurrence of the short-circuit abnormality.

Where the abnormality is of a type other than that requires emergency protection, on the other hand, it is better not to immediately operate the operation stopping means 50. Namely, the overall control system 3 that is notified of occurrence of an abnormality by the abnormality transmitting means 40 is desirably given some time to select whether to stop or change the switching commands Ps depending upon the type of the abnormality and the operating conditions of the other semiconductor devices in the bridge circuit. To ensure that the semiconductor device 1 is protected without fail, however, it is desirable to set the permissible maximum time limit in advance and stop the switching operation of the semiconductor device 1 upon a lapse of the time limit, since the overall control system 3 may possibly experience a delay or failure in dealing with the abnormality. To this end, an OR gate 52 and a time-limit circuit 53 are provided in the embodiment of FIG. 1 such that the Q output of the flip-flop 31 of each of the lower three abnormality storage circuits 30 in FIG. 1 is fed to the OR gate 52. In this arrangement, the operation stopping means 50 is operated after the lapse of the time limit set by the time-limit circuit 53 when an abnormality other than short-circuit occurs.

Before resuming the operation of the semiconductor device 1 after it is stopped as described above, there is a need to eliminate the stored abnormality in the abnormality storage circuit 30 provided that the relevant type of abnormality has disappeared. In the present embodiment, this elimination of storage is carrier out in different manners between the case where the abnormality is short-circuit and the case whether it is of any other type.

In the uppermost abnormality storage circuit 30 in FIG. 1 for storing the abnormality in the form of short-circuit, the flip-flop 31 is reset by giving a switching command PS from the driving circuit 10 to the AND gate 33 that is enabled through the inverter 32 and delay means 34 after disappearance of the abnormality. The other abnormality storage circuits 30 storing abnormalities other than short-circuit, on the other hand, are provided with a photo coupler having a photo transistor 35 and an inverter 36. The flip-flop 31 of each of these circuits 30 is reset by giving a reset command in the form of light L from a light emitting diode 3c provided in the overall control system 3 to the photo transistor 35 to turn on the transistor 35, so that the inverter 36 generates a high level of output to the AND gate that is enabled at the same time when the abnormality disappears.

The semiconductor device 1 is immediately stopped in the case of a short-circuit abnormality in the embodiment of FIG. 1 as described above. Where the overall control system 3 that is informed of the occurrence of short-circuit finds it undesirable to stop the semiconductor device 1 for a long time in view of the operation of the bridge circuit, however, the operation of the device 1 may be interrupted only for a delay time by the delay circuit 34 if the switching commands Ps are kept being given to the driving circuit 10, since the short-circuit status often disappears a short time after its occurrence. The delay time is set to within a range of 2 to several mS, for example, so that the time of interruption of the operation is shortened enough while the short-circuit status is ready to be eliminated. In the case where the abnormality is of a type other than short-circuit, on the other hand, the overall control system 3 eliminates or changes the switching commands Ps and then gives the reset command as described above to the relevant abnormality storage circuit 30, so that the bridge circuit is placed in a desired operating condition.

In FIG. 2 showing the second embodiment of the present invention, the same reference numerals as used in FIG. 1 are used for identifying structurally and/or functionally corresponding elements. Although the second embodiment of FIG. 2 has four abnormal detecting means 20 for detecting four different types of abnormalities as in the first embodiment of FIG. 1, the second embodiment is different from the first embodiment in that the respective types of abnormalities are coded using an encoder, and the obtained signals are transmitted to the overall control system 3 without using photo couplers. The semiconductor device shown in FIG. 2 is used for the upper arm of the bridge circuit that receives high voltage, as in the first embodiment. Four level shift circuits corresponding to four abnormality storage circuits 30 are incorporated in the abnormality transmitting circuit 40, and each of these level shift circuits is constructed as a series circuit of voltage dividing circuit consisting of a transistor 41 that receives the control power supply voltage Vc and a pair of resistors 43. The divided voltage of each voltage dividing circuit is given as an abnormality signal representing the corresponding type of abnormality to an encoder 44 and coded, and the resulting signal is transmitted as abnormality data of plural bits to the overall control system 3 through a bus 45. The encoder 44 receives a reference potential Ve and power supply voltage Vd from the overall control system 3, so as to operate on the same reference potential on which the control system 3 is operated.

The above-described abnormality data transmitted to the overall control system 3 are given different codes to represent four cases, i.e., simultaneous occurrence of short-circuit and overcurrent abnormalities, occurrence of only overcurrent abnormality, occurrence of undervoltage abnormality, and occurrence of overheat abnormality, for example. The data may be transmitted through the bus 45 having a three-bit structure, for example. In the embodiment of FIG. 2, the occurrence of the abnormality is transmitted in the form of the abnormality data to the overall control system 3, thus eliminating a need to use photo couplers in the abnormality transmitting circuit 40. Further, the photo coupler used in the embodiment of FIG. 1 for giving reset commands to the abnormality storage circuits 30 is also omitted in the present embodiment of FIG. 2.

While the reset commands may be transmitted through a level shift circuit as in the case of the switching command Ps if the photo coupler is omitted, the second embodiment is adapted to eliminate the stored abnormalities in all of the abnormality storage circuits 30 under a requirement that the driving circuit 10 is receiving the switching command Ps. To this end, each of the abnormality storage circuits 30 is constructed as shown in FIG. 2 such that the AND gate 33 of each circuit 30 is enabled through the inverter 32 and a delay circuit 34 after the abnormality disappears, and the flip-flop 31 is reset when the AND gate 33 that is placed in the "enabled" state receives from the driving circuit 10 a switching command PS that has been shaped. In the meantime, the flip-flop 31 generates an auxiliary Q output to the corresponding transistor 41 provided on the side of the control power supply voltage Vc of the above-described level shift circuit of the abnormality transmitting circuit 40.

In the second embodiment of FIG. 2, the time that elapses until the semiconductor device 1 is stopped upon occurrence of an abnormality other than short-circuit may be set for respective types of abnormalities. To this end, the three abnormality storage circuits 30 other than the uppermost one incorporate respective time-limit circuits 37 that receive the Q outputs of the corresponding flip-flops 31, and the outputs of these time-limit circuits 37 as well as the Q output of the flip-flop 31 of the abnormality storage circuit 30 for short-circuit abnormality are sent to the OR gate 52 so as to operate the operation stopping means 50.

The thus constructed circuit of the second embodiment of the invention operates in the same manner as that of the first embodiment where the abnormality is short-circuit. Where the abnormality is of any type other than short-circuit, however, the switching operation of the semiconductor device 1 is automatically stopped by the operating stopping means 50 when the time limit set by each of the above-described time-limit circuits 37 elapses after the abnormality occurs. While the overall control system 3 stops, changes or continues to generate the switching commands Ps depending upon the type of the abnormality or the operating condition of the bridge circuit, the abnormality storage circuit 30 eliminates the storage in response to the switching command Ps upon a lapse of the time set by the delay circuit 34 of the relevant circuit 30 after the abnormality disappears, so as to operate the semiconductor device 1.

As described above, in the abnormality detection and protection circuit of the present invention, a plurality of abnormality detecting means detect different types of abnormalities, respectively, a plurality of abnormality storage circuits store occurrence of the respective types of abnormalities, and an abnormality transmitting circuit transmits the respective types of the abnormalities to the overall control system. Further, operation stopping means is provided for stopping the switching operation of the semiconductor device that suffers from the current abnormality. Where the abnormality detected by the detecting means is of a type that requires emergency protection of the semiconductor device, the operation stopping means is immediately operated so as to automatically stop the switching operation of the semiconductor device. This arrangement yields the following effects:

(A) Since a signal indicative of the type of the abnormality that has occurred is transmitted from the abnormality transmitting circuit to the overall control system, the control system that receives this signal can appropriately eliminate, change or continue to generate switching commands in the manner most suitable for the type of the abnormality or the operating conditions of the bridge circuit or the like incorporating the semiconductor device, to thus rationally control the operation of the circuit device depending upon the actual situations. For example, the circuit of the present invention can avoid occurrence of troubles due to unexpected, sudden stop of the operation of the mechanical load that is controlled by the circuit device.

(B) Each of the abnormality storage circuits stores a corresponding one of the different types of abnormalities, and the abnormality transmitting circuit transmits a signal representing occurrence of the corresponding type of abnormality to the overall control system and maintains the transmission based on the storage of the abnormality storage circuit. When an abnormality occurs, therefore, the overall control system is given enough time to select whether to generate or stop switching commands to the driving circuit for the semiconductor device. Thus, the overall control system can select the mode of dealing with the abnormality for protecting the semiconductor device upon occurrence of the abnormality, by suitably controlling the switching commands to the driving circuit or a reset command to the relevant abnormality storage circuit, thereby to avoid such situations that the semiconductor device is uselessly stopped and resumed in a repeated manner, which may result in deterioration of characteristics of the device.

(C) Since the overall control system can select a mode of dealing with occurrence of an abnormality from various modes according to the present invention, any confusion will not arise even if the detecting level or threshold of the abnormality detecting means is set to be lower than that of the conventional detecting means. Thus, the abnormality detecting means may be constructed to detect abnormal conditions with higher accuracy so that more thorough protection can be provided for the semiconductor device.

In one preferred form of the present invention, the abnormality storage circuit includes a flip-flop and a reset means for the flip-flop, and the reset means is operated provided that the overall control system is generating switching commands to the driving circuit or that the reset means has received a reset command from the overall control system. In this arrangement, the overall control system is advantageously given enough freedom and time to deal with occurrence of an abnormality, depending upon the type of the abnormality or the operating conditions of the circuit device in which the semiconductor device is incorporated.

In a preferred form of the invention wherein the reset means is operated provided that the abnormality has disappeared, or in another preferred form in which the reset means is operated provided that a predetermined delay time has elapsed after disappearance of the abnormality, a mistake or a delay can be avoided in resuming the operation of the semiconductor device after stopping it, so that the semiconductor device can be surely protected. When an abnormality in the form of short-circuit occurs, in particular, the short-circuit status can be readily eliminated by suitably setting the delay time.

In a preferred form of the invention in which abnormalities are transmitted from the abnormality transmitting circuits to the overall control system through photo couplers, the semiconductor device can be easily incorporated in the upper arm of the power bridge circuit to which high voltage is applied. In another preferred form of the invention in which the type of the detected abnormality is coded by an encoder, and the coded signal thus obtained is transmitted to the overall control system, the construction of the circuit can be advantageously simplified by eliminating the photo couplers. A further preferred form of the invention in which the occurrence of each type of abnormality is given to the encoder through a level shift circuit corresponding to that type is also advantageous when the semiconductor device is incorporated in the upper arm of the power bridge circuit.

In a still further preferred form of the invention, the operation stopping means is operated upon a lapse of a predetermined time limit after detection of an abnormality when the detected abnormality is of a type other than that which requires emergency protection of the device, so as to stop the operation of the semiconductor device. In this form of the invention, the semiconductor device can be protected without fail even if there is a delay in dealing with the abnormality by the overall control system, or if the control system totally fails to deal with the abnormality. In another form of the invention wherein the time limit for stopping the operation of the semiconductor device is set for each of the different types of abnormalities, the semiconductor device can be most rationally protected even in such cases as described above.

What is claimed is:

1. An abnormality detection and protection circuit provided in association with a driving circuit for a semiconductor device, for detecting plural types of abnormalities, including an undervoltage abnormality, that occur in the semiconductor device and protecting the semiconductor device from the abnormalities, said driving circuit receiving switching commands to drive the semiconductor device from an overall control system for controlling a plurality of semiconductor devices, comprising:

a plurality of abnormality detecting means for detecting said plural types of abnormalities, including an undervoltage abnormality, each of said abnormalities detecting means detecting a particular type of abnormality;

a plurality of abnormality storage circuits each operatively connected to a single corresponding one of said plurality of abnormality detecting means, each said storage circuit being arranged to store an occurrence of a corresponding one of said plural types of abnormalities detected by the corresponding abnormality detecting means;

a plurality of abnormality transmitting circuits, each of which starts operating when a corresponding abnormality is stored in a single corresponding abnormality storage circuit, so as to transmit a signal representing the type of the abnormality stored in said corresponding abnormality storage circuit to said overall control system; and operation stopping means for stopping a switching operation of said semiconductor device;

wherein when the abnormality detected by said abnormality detecting means is of a type that requires emergency protection, said operation stopping means operate to automatically stop the switching operation of the semiconductor device , and when the abnormality detected does not require emergency protection, said operation stopping means operates to allow a time delay before stopping the switching operation of the semiconductor device.

2. An abnormality detection and protection circuit according to claim 1, wherein said semiconductor device is incorporated in an upper arm of a power bridge circuit to which high voltage is applied, and wherein each of said abnormality transmitting circuits, transmits said signal representing the abnormality to said overall control system through a photo coupler.

3. An abnormality detection and protection circuit according to claim 1, wherein each of said abnormality transmitting circuits, is provided with an encoder for coding said plural types of abnormalities, and transmits the respective coded types of abnormalities to said overall control system.

4. An abnormality detection and protection circuit according to claim 3, wherein said semiconductor device is incorporated in an upper arm of a power bridge circuit to which high voltage is applied, and wherein each of said plural types of abnormalities is given to said encoder through a level shift circuit.

5. An abnormality detecting and protection circuit according to claim 1, wherein said time delay used for automatically stopping the switching operation of the semiconductor device is set for each of said plural types of abnormalities.

6. An abnormality detection and protection circuit according to claim 1, wherein each of said abnormality storage circuits eliminates storage of the corresponding one of said plural types of abnormalities, in response to a reset command generated by said overall control system.

* * * * *